United States Patent
Levy et al.

(10) Patent No.: US 9,439,220 B2
(45) Date of Patent: *Sep. 6, 2016

(54) MULTIPLE NFC CARD APPLICATIONS IN MULTIPLE EXECUTION ENVIRONMENTS

(71) Applicant: TEXAS INSTRUMENTS INCORPORATED, Dallas, TX (US)

(72) Inventors: Koby Levy, Bat-Yam (IL); Ran Katz, Givatayim (IL); Tally Mane, Petach-Tikva (IL); Rachel Stahl, Givat Shmuel (IL)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/641,520

(22) Filed: Mar. 9, 2015

(65) Prior Publication Data

US 2015/0181621 A1 Jun. 25, 2015

Related U.S. Application Data

(63) Continuation of application No. 13/343,779, filed on Jan. 5, 2012, now Pat. No. 8,977,195.

(60) Provisional application No. 61/430,414, filed on Jan. 6, 2011.

(51) Int. Cl.
| | |
|---|---|
| *H04W 74/06* | (2009.01) |
| *G06K 7/10* | (2006.01) |
| *H04B 5/00* | (2006.01) |
| *H04W 76/04* | (2009.01) |

(52) U.S. Cl.
CPC .......... *H04W 74/06* (2013.01); *G06K 7/10237* (2013.01); *H04B 5/0031* (2013.01); *H04W 76/045* (2013.01)

(58) Field of Classification Search
CPC ......... H04M 1/7253; H04M 2250/04; H04M 2250/06; H04M 1/72572; H04M 1/72577; H04M 2250/12; H04M 1/18; H04M 1/24; H04M 1/72519; H04W 74/06; H04W 76/045; H04B 5/0031; G06K 7/10237

See application file for complete search history.

(56) References Cited

U.S. PATENT DOCUMENTS

| | | | | |
|---|---|---|---|---|
| 8,332,272 | B2* | 12/2012 | Fisher | G06Q 20/20 455/406 |
| 8,639,629 | B1* | 1/2014 | Hoffman | G06Q 20/20 705/44 |
| 8,667,285 | B2* | 3/2014 | Coulier | G06F 21/31 380/259 |
| 2008/0125107 | A1* | 5/2008 | Zechlin | H04W 12/02 455/422.1 |
| 2014/0154982 | A1* | 6/2014 | Dua | G06F 17/30058 455/41.1 |

* cited by examiner

*Primary Examiner* — Andrew Wendell
*Assistant Examiner* — Maryam Soltanzadeh
(74) *Attorney, Agent, or Firm* — Ronald O. Neerings; Frank D. Cimino

(57) ABSTRACT

A contactless system is described in which multiple execution environments may be coupled to a near field communication (NFC) controller, wherein each execution environment is configured to communicate with remote readers via the NFC controller using an assigned one of a plurality of communication protocols. During a polling session from a proximate reader, responding to a request command using a requested communication protocol and activating one of the plurality of execution environments assigned to the requested communication protocol to use the NFC controller. An arbitration is performed in response to each polling session such that a same combination of communication protocol and execution environment is not activated for adjacent polling sessions.

23 Claims, 6 Drawing Sheets

MULTIPLE NFC CARD APPLICATIONS IN MULTIPLE EXECUTION ENVIRONMENTS

CLAIM OF PRIORITY UNDER 35 U.S.C. 119 ((A) FOREIGN, (E) PROVISIONAL)

This application is a continuation of application Ser. No. 13/343,779, filed Jan. 5, 2012 (now U.S. Pat. No. 8,977, 195), which claims the benefit of and incorporates by reference US Provisional Application No. 61/430,414, filed Jan. 6, 2011, entitled "Multiple NFC Card Applications in Multiple Execution Environments."

FIELD OF THE INVENTION

This invention generally relates to use of a near field communication controller within a mobile device, such as a cell phone, in which multiple card applications are enabled.

BACKGROUND OF THE INVENTION

Near Field Communication (NFC) is a wireless technology allowing two devices to communicate over a short distance of approximately 10 cm or less. NFC is standardized internationally within NFC Forum specifications and defined in ISO/IEC 18092, ECMA-340, and ISO 14443, for example. NFC allows a mobile handset to interact with a subscriber's immediate environment. With close-range contactless technology, mobile handsets may be used as credit cards, to access public transportation, to access secured locations, and many more applications.

A chip in the handset may perform the wireless near field communication to an adjacent reader, smart card, or other handset. The display, keyboard, and the mobile network capability of the handset enable the implementation of a wide range of powerful applications. To protect the consumer, these applications must be securely deployed and managed regardless of where the subscriber is and the time of day. The UICC (universal integrated circuit card), also referred to as USIM (universal subscriber identity module), is a secure environment for deploying these applications. An embedded secure environment chip may also be provided by some handsets.

A subscriber identity module (SIM) is an integrated circuit that securely stores its unique serial number (ICCID), an International Mobile Subscriber Identity (IMSI) and the related key used to identify and authenticate subscriber on mobile telephony devices such as mobile phones and computers. A SIM also contains temporary information related to the local network, a list of the services to which the user has access, and passwords.

USIM (Universal Subscriber Identity Module) is an application for UMTS mobile telephony running on a UICC smart card which is inserted in a 3G mobile phone. There is a common misconception to call the UICC itself a USIM, but the USIM is merely a logical entity on the physical card. It stores user subscriber information, authentication information and provides storage space for text messages and phone book contacts. The phone book on a UICC has been greatly enhanced. For authentication purposes, the USIM stores a long-term pre-shared secret key, which is shared with the Authentication Center (AuC) in the network. The USIM also verifies a sequence number that must be within a range using a window mechanism to avoid replay attacks, and is in charge of generating the session keys to be used in the confidentiality and integrity algorithms of the KASUMI block cipher in UMTS. The equivalent of USIM on CDMA networks is CSIM.

The capabilities of a UICC have been skyrocketing in the last few years, with fast processors and multi-megabyte capacities squeezed into the diminutive package. A UICC card is typically connected to a host processing module on a handset using an ISO 7816 (Industry Standards Organization) protocol; while a UICC may also include a fast, universal serial bus (USB) interface. The adoption of USB leaves one pin free on the UICC package, and it is over this single wire that the USIM can communicate with NFC hardware on the handset. Alternatively, other pins may be used, such as "programming voltage VPP" pin C6 that is available regardless of USB use. The Single Wire Protocol (SWP) for this purpose has been approved as a standard by the European Technical Standards Institute (ETSI) as TS 301 631.

Various systems may also include an embedded security element that includes a processor and memory. The embedded security element may include a secure operating system that allows the execution of various applications within the security element. Currently, vendors such as Gemalto and Giesecke & Devrient provide secure operating systems for use on embedded security elements.

Multiple NFC applications may be enabled, configured or uploaded at the same time on a mobile handset, such as one or more credit card emulations, one or more transportation tokens/tickets, one or more access badges or keys to restricted locations, etc.

BRIEF DESCRIPTION OF THE DRAWINGS

Particular embodiments in accordance with the invention will now be described, by way of example only, and with reference to the accompanying drawings.

Figure 1:
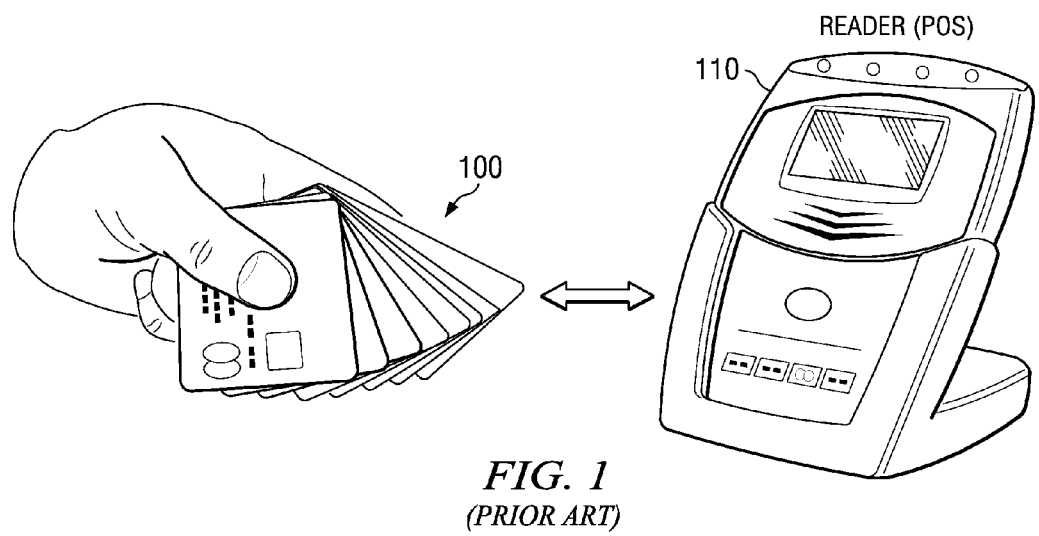
FIG. 1 is an illustration of a set contactless devices.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Contactless systems have been around for a while, and are common as access control ID's (e.g. employee badges), as well as payment systems for public transportation etc. More recently, credit cards are beginning to include NFC capability. Lately, contactless capabilities are being integrated into mobile phones as well; recent examples are Nokia's 6212 phone and Google's Android, which supported NFC in its latest release.

Embodiments of the invention provide for managing multiple Near Field Communication (NFC) applications in multiple execution environments. Execution environments may be provided by a Host/Application Processor, a Universal Integrated Circuit Card (UICC/SIM) embedded processor, and an embedded Secure Element (SE), for example. The multiple applications are managed automatically and in transparent manner, over a single RF interface through the NFC controller, without a need for user intervention to explicitly select the "active" application and execution environment prior to each transaction. The term "contactless system" in this document is intended to cover any contactless system, such as NFC, ISO14443, ISO 15693 (proximity cards), JIS-6319-4, ISO18092, EMVCo, any "RFID" (radio frequency identification) system etc., that supports multiple NFC applications.

Card applications, which are also referred to as "Tag" of different types by the NFC Forum, may also include Peer to Peer Target applications.

Multiple applications may be managed by implementation of smart arbitration by the NFC controller between several (pre)enabled applications and execution environments coupled to the NFC Controller, thereby allowing automatic and interoperable NFC transactions without a need for user involvement. The arbitration may be performed through their registry introduction to the remote "polling" device, for example.

Application arbitration provides a system level solution, allowing implementation of multiple card applications while avoiding starvation of any of the applications without a need for user intervention. The procedures that will be described in more detail below are interoperable with all known NFC and contactless readers' polling schemes. Application arbitration allows employment of multiple execution environments without a need for duplication of their corresponding physical transport interfaces, hence minimizing silicon size.

FIG. 1 is an illustration of a set of contactless devices 100, which in this example may be various smart credit or debit cards, transportation system fare cards, access badges, etc. Each card contains an NFC circuit that allows it to communicate with a reader, such as point of sale (POS) reader 110, when the card is placed in close proximity to the reader. As will be explained in more detail below, various types of readers and NFC technologies exist; for example, smart credit cards use a different NFC transport technology than access badges. As used herein, the terms "transport technology", "communication protocol" and similar phrases mean the same thing and refer to a specific physical layer and media access layer used for NFC by a particular smart card or access badge.

NFC is a set of short-range wireless technologies, typically requiring a distance of 4 cm or less. Some NFC embodiments operate at 13.56 MHz on ISO/IEC 18000-3 air interface and at rates ranging from 106 kbit/s to 424 kbit/s, for example. Other embodiments may be based on existing radio-frequency identification (RFID) contactless standards including ISO/IEC 14443 and FeliCa, for example. Embodiments may also utilize later developed standards for contactless communication. NFC always involves an initiator and a target; the initiator actively generates an RF field that can power a passive target. This enables NFC targets to take very simple form factors such as tags, stickers, key fobs, or cards that do not require batteries. NFC peer-to-peer communication is possible, provided both devices are powered. NFC tags contain data and are typically read-only but may be rewriteable. They can be custom-encoded by their manufacturers or use the specifications provided by the NFC Forum, an industry association charged with promoting the technology and setting key standards. The tags can securely store personal data such as debit and credit card information, loyalty program data, PINs and networking contacts, among other information. The NFC Forum defines four types of tags which provide different communication speeds and capabilities in terms of configurability, memory, security, data retention and write endurance. Tags currently offer between 96 and 4,096 bytes of memory.

Figure 2:
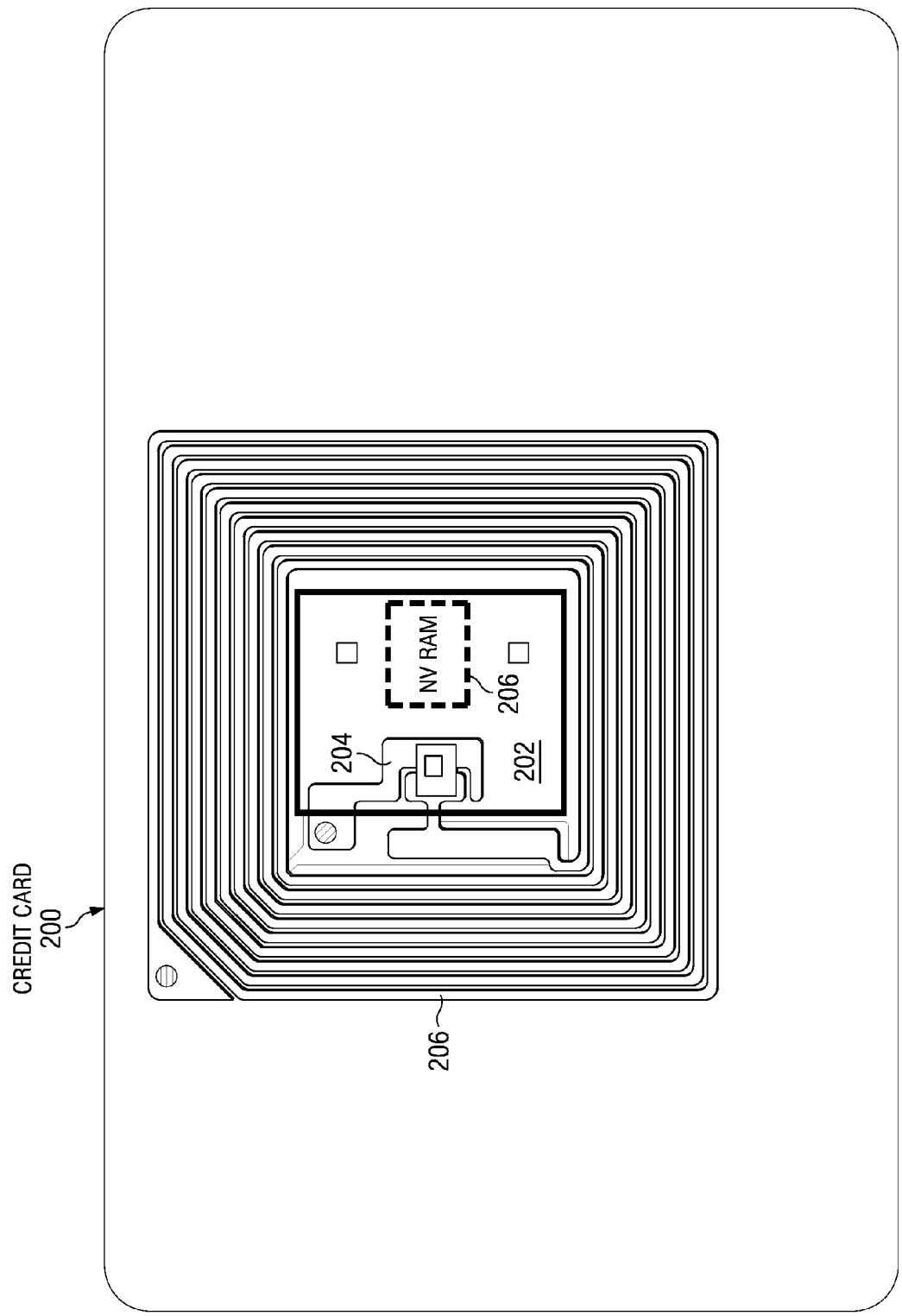
FIG. 2 is a schematic diagram of a contactless device.

FIG. 2 is an illustration of a contactless device 200, which in this example is representative of a credit card. A small integrated circuit 202 includes a capacitor 204 that is coupled to coil 206. Proximity cards as well as vicinity cards are powered by resonant inductive coupling via an LC circuit including capacitor 204 and coil 206 that are connected in parallel. When the card is placed in proximity to a card reader, the card reader produces an electromagnetic field that excites the coil and resonant current charges the capacitor, which in turn energizes and powers IC 202. IC 202 may also include a simple processor with application software stored in read only memory. IC 202 may also include a small amount of non-volatile RAM 208 that is used to store parameters while the card is processing a transaction while powered by a nearby card reader.

Figure 3:
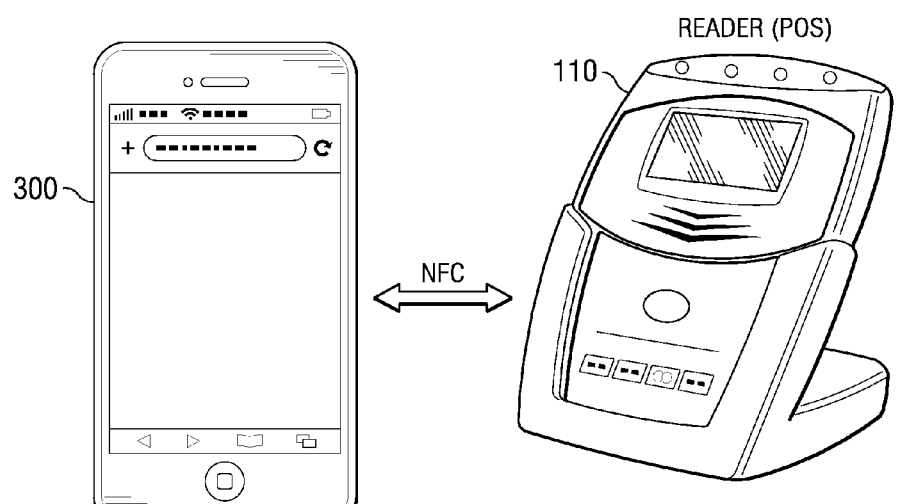
FIGS. 3-5 illustrate a mobile handset that is emulating a set of contactless devices.

FIG. 3 illustrates a mobile handset 300 that is emulating a set of contactless devices. All of the various cards 100 illustrated in FIG. 1 may be emulated by applications executed within mobile handset 300. Execution environments may be provided by a Host/Application Processor, a Universal Integrated Circuit Card (UICC/SIM) embedded processor, and an embedded Secure Element (SE), for example. The multiple applications are managed automatically and in transparent manner, over a single RF interface, without a need for user intervention to explicitly select the "active" application and execution environment prior to each transaction. In this manner, the mobile handset may completely replace the need for separate and individual credit and debit cards, access badges, transportation tokens, etc.

Figure 4:
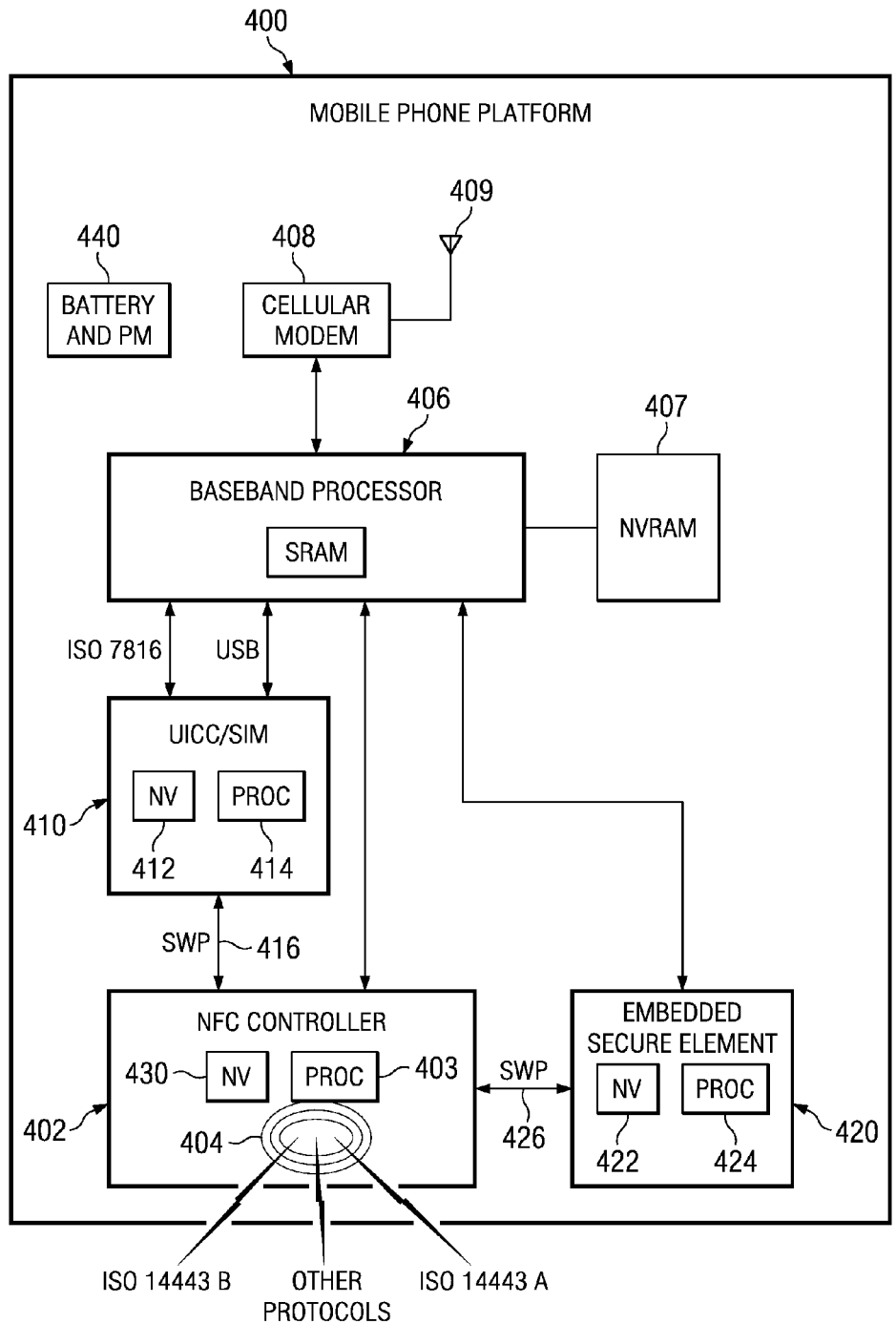

FIG. 4 is a block diagram of a mobile handset 400 that includes a near field communication controller 402. Multiple applications are managed automatically and in transparent manner, over a single RF interface provided by the NFC controller, without a need for user intervention to explicitly select the "active" application and execution environment prior to each transaction.

Handset 400 includes a baseband processor 406 that typically includes SRAM for holding application software data. A separate non-volatile RAM 407 may be coupled to host processor 406 for holding application software that is executed by processor 406. Cellular modem 408 is coupled to baseband processor 406 and modulates and demodulates data from cellular radio frequency (RF) signals sent and received from a cellular network via antenna 409. UICC/SIM 410 is a removable card that is coupled to host processor 406 via a standardized interface, such as ISO 7816. UICC 410 includes a NVRAM 412, generally in the form of flash memory, which may be used to store data such as names, addresses, phone numbers and other info in a phone book format. UICC 410 may also include embedded processor 414 that may execute application software stored in NVRAM 412 or in other read only memory, not shown, within UICC 410. A mobile handset may also include a screen and either an actual or emulated keypad that provides a graphical user interface. Mobile handset 400 is normally powered by battery and power management circuitry 440; however handset 400 may also be powered from an external power source that is connected to power management circuitry 440. The general operation of cellular mobile handsets is well known and will not be described in further detail herein.

As discussed above, mobile handsets are now being configured to emulate credit cards, access cards, bus/transportation tokens, etc. In order to support these applications, an embedded secure element (eSE) 420 may be included within handset 400. eSE 420 includes an embedded processor 424 that may execute application software stored in NVRAM 422 or in other read only memory, not shown, within eSE 420.

In principle, NFC controller 402 operates similarly to contactless device 200. Embedded processor 403 may include simple ROM in which various application programs are stored for execution by embedded processor 403. The NFC Controller's ROM may also include and run the Media Access (MAC) layer of the NFC/contactless protocols as well as handle the interfaces to the NFC Execution Environments (UICC/eSE) which would include and run these various application programs NVRAM 430 that is used by NFC controller 402 for storing parameters may be located within NFC controller 402, be a separate component that is coupled to NFC controller 402, or be provided by another device such as UICC 410 or eSE 420 acting as an NVRAM server, for example.

NFC controller 402 is designed to perform transactions with nearby devices using standardized communication protocols. An example of such a protocol is ISO/IEC 14443. ISO/IEC 14443 consists of four parts and describes two types of cards: Type A and Type B, both of which communicate via radio at 13.56 MHz. The main differences between these types concern modulation methods, coding schemes (Part 2) and protocol initialization procedures (Part 3). For example, in one protocol, NFC employs two different codings to transfer data. If an active device transfers data at 106 kbit/s, a modified Miller coding with 100% modulation is used. In all other cases Manchester coding is used with a modulation ratio of 10%. Both Type A and Type B cards use the same transmission protocol described in Part 4. The transmission protocol specifies data block exchange and related mechanisms: data block chaining; waiting time extension; multi-activation, etc. There are other types of defined protocols, such as type F, etc.

There are two modes of near field communication: passive communication mode and active communication mode. In passive communication mode, the initiator device provides a carrier field and the target device answers by modulating the existing field. In this mode, the target device may draw its operating power from the initiator-provided electromagnetic field, thus making the target device a transponder. In active communication mode, both initiator and target device communicate by alternately generating their own fields. A device deactivates its RF field while it is waiting for data. In this mode, both devices typically have power supplies. NFC devices are able to receive and transmit data at the same time. Thus, they can check for potential collisions if the received signal frequency does not match with the transmitted signal's frequency.

For each protocol, of a certain (ISO-DEP) type, sixteen or more bytes of NVRAM may be required to identify the application (also known as Application ID or "AID") As discussed above, there may be a number of protocols that need to be supported on a mobile handset in which it is desirable to emulate a large number of credit cards, access cards, transportation cards/token, etc. Therefore, a considerable amount of NVRAM 430 may be needed by NFC controller 402 to keep track of all of the various parameters.

When mobile handset 400 is turned off, or its battery charge is low or depleted, NFC controller 402 may be powered by resonant inductive coupling via an LC circuit including a capacitor, not shown, and antenna coil 404 that are connected in parallel. When handset 400 is placed in proximity to a card reader, the card reader produces an electromagnetic field that excites the coil and resonant current charges the capacitor, which in turn energizes and powers NFC 402, in a similar manner to the operation of contactless device 100. In this embodiment, the resonant circuit of NFC 402 is capable of producing enough current to power NFC controller 402 and UICC 410 by scavenging power from the electromagnet field when handset 400 is placed in proximity to an external card reader or other reader device. Operation of UICC 410 in low power mode, including processor 414 and NVRAM 412 requires approximately 5 ma. Power sharing circuitry is provided that allows UICC 410 and NFC controller 402 to operate from battery 440 or an external power source that is connected to power management circuitry 440 or from power scavenged from an impinging electromagnetic signal by coil 404 when battery power or external power is not available. Similarly, eSE 420 may be configured to operate in a low power mode using power scavenged from an impinging electromagnetic field when battery power or external power is not available. Therefore, UICC 410 and/or eSE 420 may be able to provide an emulation application to NFC controller 402 even when the handset battery 440 is turned off, depleted of charge, or even removed from handset 400.

Figure 5:
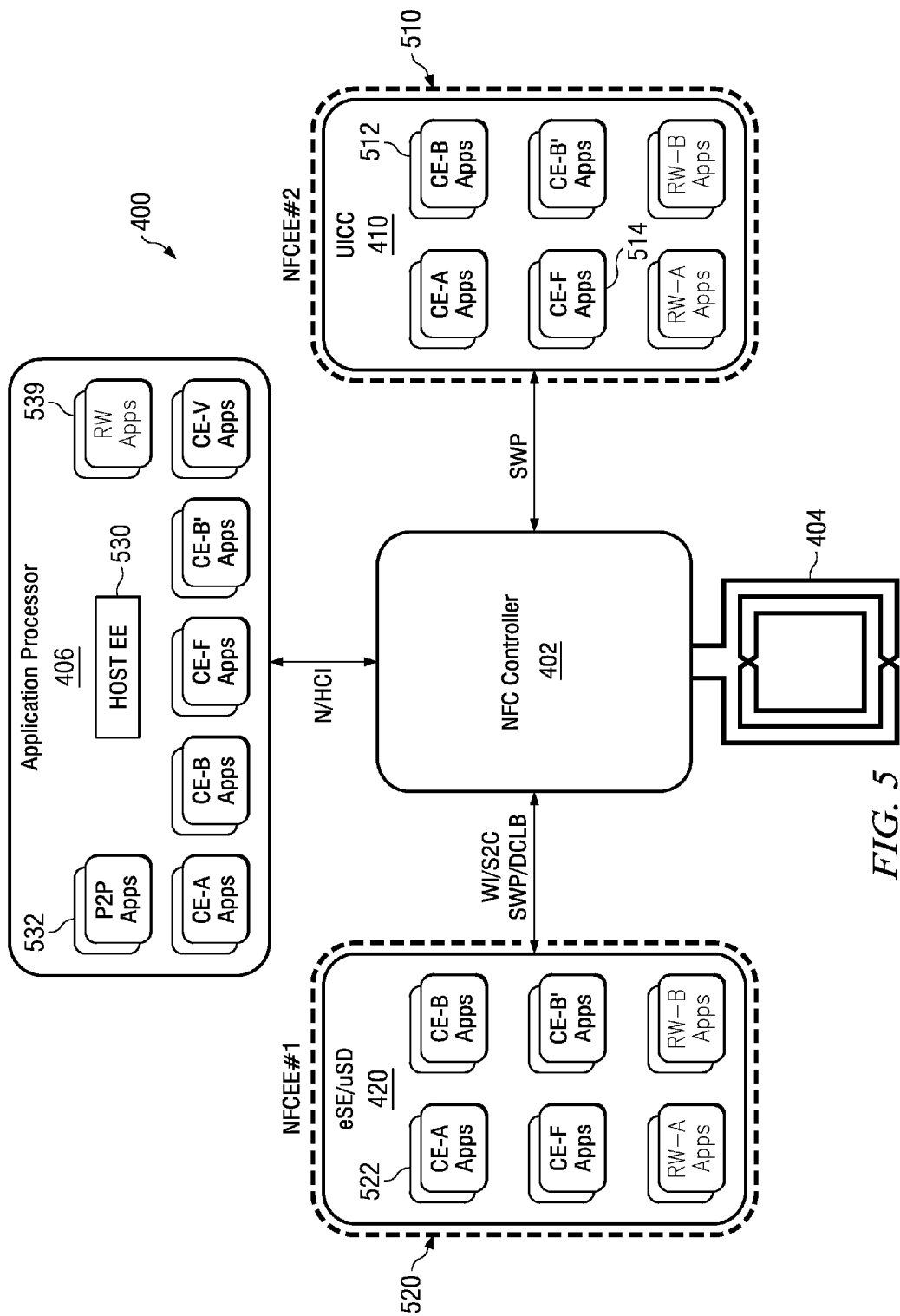

FIG. 5 is a block diagram illustrating several applications that are hosted within several different execution environments (NFCEE) by handset 400. NFC execution environment 510 is implemented within UICC 410 by executing software instructions stored within NV memory 412 or other memory by embedded processor 414. NFC execution environment 520 is implemented within eSE 420 by executing software instructions stored within NV memory 422 or other memory by embedded processor 424. Embedded secure element 420 may also be a micro secure device (pSD). Host execution environment 530 is implemented by baseband processor 406 by executing software instructions stored within NV memory 407 or other memory that is coupled to baseband processor 406.

Various applications may be executed within each of the execution environments by storing appropriate application software in the associated memories. For example, application processor 406 may have a peer to peer emulator 532 that uses transport technology A and/or F. It may also have a card emulator CE-A for transport technology A that emulates one or more credit cards, a card emulator CE-B for transport technology B, card emulator CE-F for transport technology F, card emulator CE-B' for transport technology B', card emulator CE-V for transport technology V, etc. It may also have applications 539 for reading and writing a remote NFC Card, e.g. for "Smart Poster" use-case for reading bus time-table, coupons or commercial data from an NFC stored poster rather than the local UICC. The local UICC may be read/written by the Host through the 7816 UF or through the NFC controller itself using additional "RW" code (not shown).

UICC 410 may have a card emulator for transport technology A (CE-A) that emulates one or more credit cards. It may also have a card emulator CE-B 512 for transport technology B, card emulator CE-F 514 for transport technology F, card emulator CE-B' for transport technology B', card emulator CE-V for transport technology V, etc. It may also have applications for reading and writing remote NFC cards and/or UICC 410, for example.

Similarly, eSE 420 may have a card emulator 522 for transport technology A (CE-A) that emulates one or more credit cards. It may also have a card emulator CE-B for transport technology B, card emulator CE-F for transport technology F, card emulator CE-B' for transport technology B', card emulator CE-V for transport technology V, etc. it may also have applications for reading and writing UICC 410, for example.

Near Field Communication incorporates a variety of standard transmission layer technologies, commonly referred to as A, B & F. Additional legacy contactless technologies exist, such as ISO15693/Vicinity which is not yet included in NFC forum, but NFC controllers are expected to support it. Calypso/B' a proprietary technology from a company named Innovatron. Various communication protocols are deployed on top of these underlying transmission layers, such as Mifare, a (proprietary) protocol that is broadly available for transportation systems such as the London tube, etc. Felica is a protocol that is broadly deployed in the Far East. EMV (Europay, MasterCard, Visa) is a communication system for credit cards that is promulgated by EMVco, a joint venture of Europay, MasterCard, and Visa that holds the credit card contactless payment standards. iClass is a communication system for access control.

Each transmission layer uses a different connection-establishment procedure that occurs during a polling loop initiated by a reader (/P2P initiator) device; however, EMVco requires only one response per polling loop to prevent sniffing or use of two cards to game the system.

As discussed above, a mobile handset is expected to support multiple contactless applications (e.g. ticketing, payment, access control, etc.), which could each be based on a different communication technology type. Each could run from a different execution environment: Host EE 530, UICC NFCEE 520, and eSE/pSD NFCEE 510. A credit card or other smart card implements only one technology, but a cell phone or other mobile device may emulate many different types of cards. Therefore, a procedure is needed to decide on which technology to use to respond to a polling device to address the specific need of that polling device.

Figure 6A:
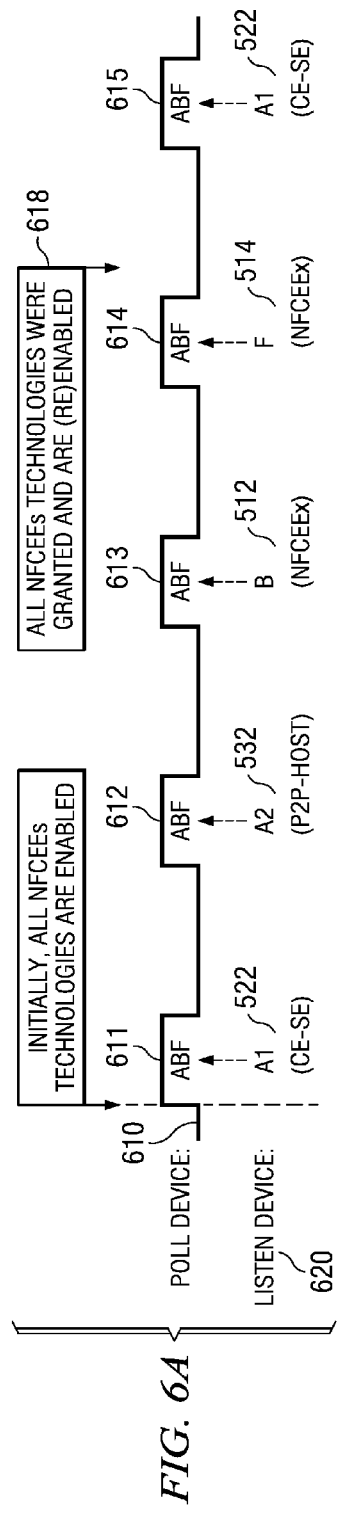
FIGS. 6A-6C are timing diagrams illustrating arbitration of multiple NFC applications during polling loops.
Figure 6B:
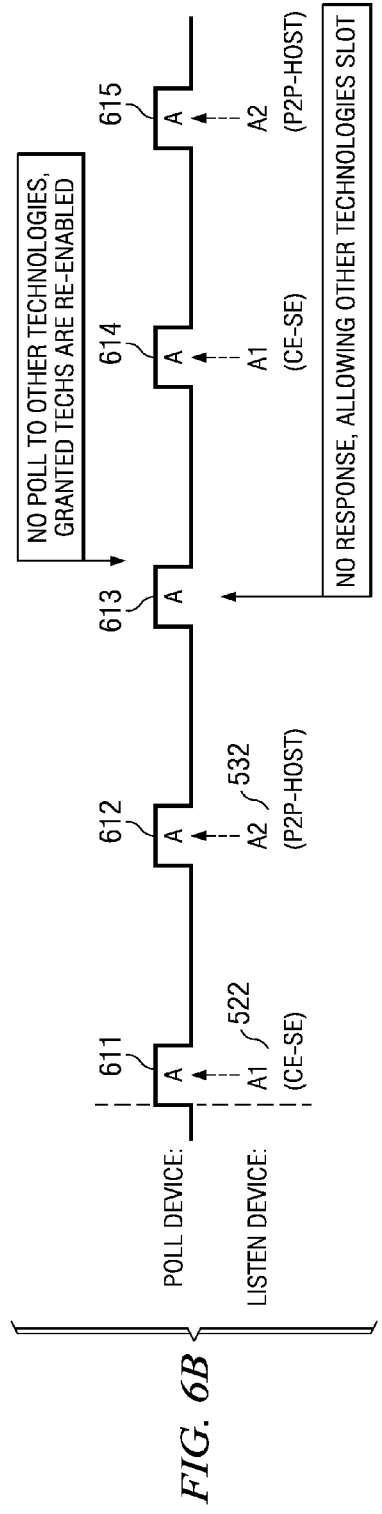
Figure 6C:
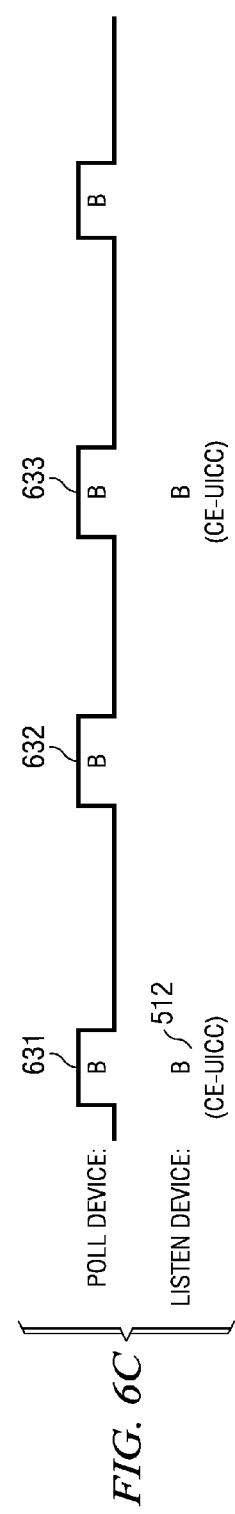

FIGS. 6A-6C are timing diagrams illustrating arbitration of multiple NFC applications on handset 400 during polling loops initiated by a reader device that is in near proximity to handset 400. Referring again to FIG. 5, application processor 406 may host several different card emulations from different technologies. SIM card 410 and embedded SE 420 may also have one or more card emulators that are currently enabled.

For example, assume UICC 410 has an active credit card emulator CE-A 512 using transport technology A, and card emulator CE-F 514 using transport technology F; eSE has an active transportation ticket emulator CE-B 522 using transport technology B; and host 406 has an active peer to peer (P2P) application 532 using transport technology A. It may be desirable to have all of the cards enabled simultaneously so that a user can swipe their handset across any reader (point of sale, transportation, etc) and the appropriated transport technology and correct card will be presented and selected. In this example, there may be up to three execution environments UICC, eSE, and host. Each NFCEE may have one or more applications running in a given technology.

Taking the example further, a remote phone may use a peer to peer (p2p) protocol to communicate with local phone. In this case, the remote phone may poll for all technologies (A, B, F, etc) since it doesn't know what the local phone may have. However, there are conflicting requirements. The local phone may want to expose all of its technologies to the polling request since it doesn't know what the remote phone is looking for. However, for payment scenarios, a talker (in this case the local phone) is not supposed to reveal more than one technology on each polling loop of the reader device. This is for security reasons defined by EMVco for any payment type reader.

A smart arbitration scheme will now be described for supporting multiple applications and execution environments in an automatic and interoperable manner. The scheme is based on arbitrating the applications' technologies and execution environments that would be presented to the remote reader device and is useful when a "higher layer" arbitration/application selection (e.g. using Application ID) is not possible (e.g. the NFCEEs registries, which are set to the NFCC by each execution environment for its connection establishment process, can't be merged into a single registry to be presented to the remote Reader/POS, when several proprietary, e.g. "Mifare Classic", card applications are used in different NFCEEs or when an eSE with a low-level interface type such as Wired Interface is used wherein the NFC Controller has no control and is not aware of the chip-stream data which is transferred between its Antenna UF and the SE). The arbitration scheme involves both the physical layer (PHY) transport technology and the media access control (MAC) layer of the NFC that is implemented in NFC controller 402. The PHY layer has the ability to detect all technologies' packets across the various rates per packet using a start of frame (SoF) based algorithm. The MAC layer implements a smart arbitration algorithm that monitors the poller's pattern Including when this is transferred to an eSE with a low-level interface type such as "Wired Interface". The arbitration algorithm includes: detection of the reader's polling restart which is then used as an arbitration trigger; a record of non granted technologies which is used to set priority of pending applications in order to prevent starvation during prioritized polling; and sniffing of certain protocols to detect a current communication state.

Arbitration of the active applications is done in a two phase round-robin manner: (1) transport technology; and (2) execution environment. In the first technology phase, only a single technology is presented in each polling loop. Doing this enables compliance with EMVCo standards that require only a single card be presented for a given transaction.

FIG. 6A illustrates the example described above in which a reader device in proximity to handset 400 is asking for several technologies, ABF, which may occur in a peer to peer exchange, for example. In this example, a mobile handset may have emulation apps for Visa A, transport ticket B, p2p, etc. A remote mobile handset reader may want to transfer phonebook contact info between the two phones and starts a polling loop asking for any of several technologies. The local responder doesn't know what the reader is looking for, therefore it may be better to reveal all capabilities. For example, a reply with technology A may be presented to a polling command, the remote reader will attempt to do data transfer, and then may resume polling. However, prior devices may lock onto the first match that occurs. In embodiments of the invention, the next polling loop may be used to trigger the arbitration process, de-grant the A technology and present a different response on the next poll, as will be explained in more detail below.

Line 610 represents a periodic polling loop that is periodically asking for ABF technologies, for example. In other examples, a different combination of technologies may be requested, based on the capabilities of the reader device. Each polling request 611-615 is initiated by the reader device using now known or later developed NFC polling commands to indicate what technologies the reader is interested in. There is a request command or a poll command for each requested technology.

NFC controller 402 in handset 400 is acting as a listening device and responds to the polling requests as illustrated by line 620 using the application arbitration scheme described herein. There is a request command or a poll command for each technology of interest by the remote reader. Recall that NFC controller 402 has four active applications in this example: two technology A applications 522, 532, one technology B application 512, and one technology F application 514. In this example, NFC controller 402 responds to a poll command for transport technology A in poll loop 611 as indicated at A1 and grants access to NFC controller 402 to application 522 which is a card emulator using technology A executed in NFCEE 520 by embedded processor 424 in eSE 420. Application 522 then may perform a transaction with the remote reader if the remote reader responds with appropriate transaction commands.

On next polling loop 612, the reader again sends poll commands for technologies ABF. NFC controller 402 responds with A2 and grants access to NFC controller 402 to application 532 which is a p2p emulator using technology A executed in host EE 530 by host processor 406. Application 532 then may perform a transaction with the remote reader if the remote reader responds with appropriate transaction commands. Notice that NFC controller 402 is keeping track of each active application by technology type and is granting access to each in a round robin manner.

Each communication technology (tech(x)) may have an arbitration "weight" configuration, allowing it to get more than one polling loop grant to increase its priority, for example, in cases of unrecoverable link errors/applications that require two sessions with the remote reader etc.

Some readers don't switch off their field in between polling attempts which adds complexity, since otherwise arbitration could be initiated only by a trigger of the field switching off.

On next polling loop 613, the reader again sends poll commands for technologies ABF. Since all tech(A) have been granted and hence moved to "degrant" state, other technologies may be presented to the reader to thereby avoid starvation of the other technologies. NFC controller 402 may therefore respond with B, and grant access to NFC controller 402 to application 512 which is a card emulator using technology B executed in NFCEE 510 by embedded processor 414 in UICC 410, for example. Application 522 then may perform a transaction with the remote reader if the remote reader responds with appropriate transaction commands.

On next polling loop 614, the reader again sends poll commands for technologies ABF. NFC controller 402 responds with F, and grants access to NFC controller 402 to application 514 which is a card emulator using technology F executed in NFCEE 510 by embedded processor 414 in UICC 410. Application 514 then may perform a transaction with the remote reader if the remote reader responds with appropriate transaction commands. Notice that NFC controller 402 is keeping track of each active application by technology type and is granting access to each in a round robin manner.

On next polling loop 615, the reader again sends poll commands for technologies ABF. Since all four active applications in this example have now been granted 618, NFC controller 402 responds with A1 and the overall sequence is then repeated.

Once a responder replies, the poller performs whatever transaction it was wanting to do, then may do another polling loop. Some readers may turn off the electromagnetic field between polling loops, others may leave it on.

The round robin arbitration sequence illustrated in FIG. 6A supports the EMVCo requirement of allowing only one transport technology per polling loop, but does not result in starvation to any application because each technology is quickly presented. Starvation may be a problem in others schemes; for example, if a responder locks onto whichever technology is accepted first, then other technologies on the responder may be starved.

FIG. 6B illustrates an example in which a reader device in proximity to handset 400 is asking for a single technology A. This is representative of a transportation reader that is only looking for a single type of fare card. In this example, assume handset 400 has the same four NFC applications active as in the example of FIG. 6A. In this example, NFC controller 402 responder replies with A1 for active application 522 in response to first polling loop 611, then on next loop 612 NFC controller 402 responder replies with A2 for active application 532. Since in this example there are only two active applications using transport technology A, NFC controller then skips one polling loop 613 to check to see if there is a request by the reader via poll commands for its other enabled technologies. If there are no other requested technologies, it may then re-enable the previously presented A1 and A2 on following polling loops 614, 615. Skipping polling loop 613 may encourage the poller to ask for another technology if the poller had locked on the first response.

A non response is forced typically when an already granted technology is being polled again. Adjacent polls to the same technology don't necessarily mean that only one protocol is requested.

FIG. 6C illustrates an example in which a reader device in proximity to handset 400 is asking for a single technology B. In this example, assume handset 400 has the same four NFC applications active as in the example of FIG. 6A. In this example, NFC controller 402 responder replies with B for active application 512 in response to first polling loop 631. Since in this example there is only one active application using transport technology B, NFC controller then skips one polling loop 632 and then re-enables the previously presented B on following polling loop 633. Skipping polling loop 632 may encourage the poller to ask for another technology if the poller had locked on the first response.

As illustrated in the preceding examples, multiple NFC execution environments 510, 520, 530 may be supported on handset 400. By allowing only a single NFCEE to be activated at any given time allows use of only a single transport module 402 since at any given time there is only one NFCEE activated. Performing an arbitration in response to each polling session ensures that a same combination of communication protocol and execution environment is not activated for adjacent polling sessions.

Another aspect of the application arbitration scheme is to keep a record of non-granted technologies to set priority for addressing starvation in prioritized polling devices. A poller may prefer a particular technology and give the preferred technology priority by performing multiple polls; for example, a poller may do an A A A B F poll sequence. In this case, if NFC controller 402 responds with A on the first poll, then skip one (as discussed above) and then again responds with A on the third poll because there was no request for another technology, then there could still be cases of starvation of B, or F. Therefore, NFC controller 402 may record fact the B and F have not yet been granted and raise their priority on the local side) Once a certain technology has been recorded as "was polled but wasn't granted", the NFCC may degrant the already granted technologies until the non-granted technology gets served.

In some embodiments, the arbitration scheme may also include a prioritization configuration table, or other form of configuration, that may be used during each arbitration event to decide which presentation technology and/or NFCEE is first granted. Prioritization may be used to optimize latency for specific applications, such as transportation. For example, a transportation application may have a short timeout window that is enforced by a transportation service reader to eliminate passenger queuing up due to a long arbitration process that attempts to select several applications before reaching the desired transportation application. For example, it may only issue a few polling loops. Therefore, it may be beneficial to choose to prioritize a transportation transaction to avoid timeouts.

If a user has several credit cards, for example, the user want to prioritize which one gets used, or which one gets used at particular merchants, etc. An application may be provided on the mobile device user interface that allows a user to identify a preferred priority or usage for the various contactless cards that are being emulated on the mobile handset. There may be a pop-up application when interacting with a POS reader that allows the user to select which credit card to use for that merchant, for example. This information may be retained for later prioritization use.

Another aspect of the application arbitration scheme may be to "sniff" the received communication path for certain protocols. Typically, transfers to UICC uses a higher MAC layer access in the form of transferring link packets over a defined HCI with API set. However, a secure execution environment may be implemented in the UICC or eSE. In some types of the later (eSE) case, the interface with NFC controller is "chip stream" based. For example, a wired interface type of SE such as Smart MX by NXP. In a chip stream interface, the MAC level does not get involved and data from antenna 404 is routed directly to the eSE chip such that the MAC layer resides within the secure element itself. In this case, the NFC controller does not parse the commands in any way but just sends them directly to the secure element. In other words, the NFC controller is just acting as a dumb pipe. However, in this case the NFC controller still "sniffs" the data stream in order to keep track of what communication state the secure element is currently in. This allows the NFC controller to determine when the reader has resumed its polling loop and therefore perform the next arbitration to try to grant other technologies and other execution environments so as to prevent starvation.

For example, Rx communication path sniffing may be performed for WI (wired interface), which is a proprietary interface from NXP Semiconductor to access secure elements that has become standardized. Sniffing may also be performed for DCLB, (digital contactless bridge), which is a proprietary interface from Infineon for access to a secure element detection of SE communication state.

Figure 7:
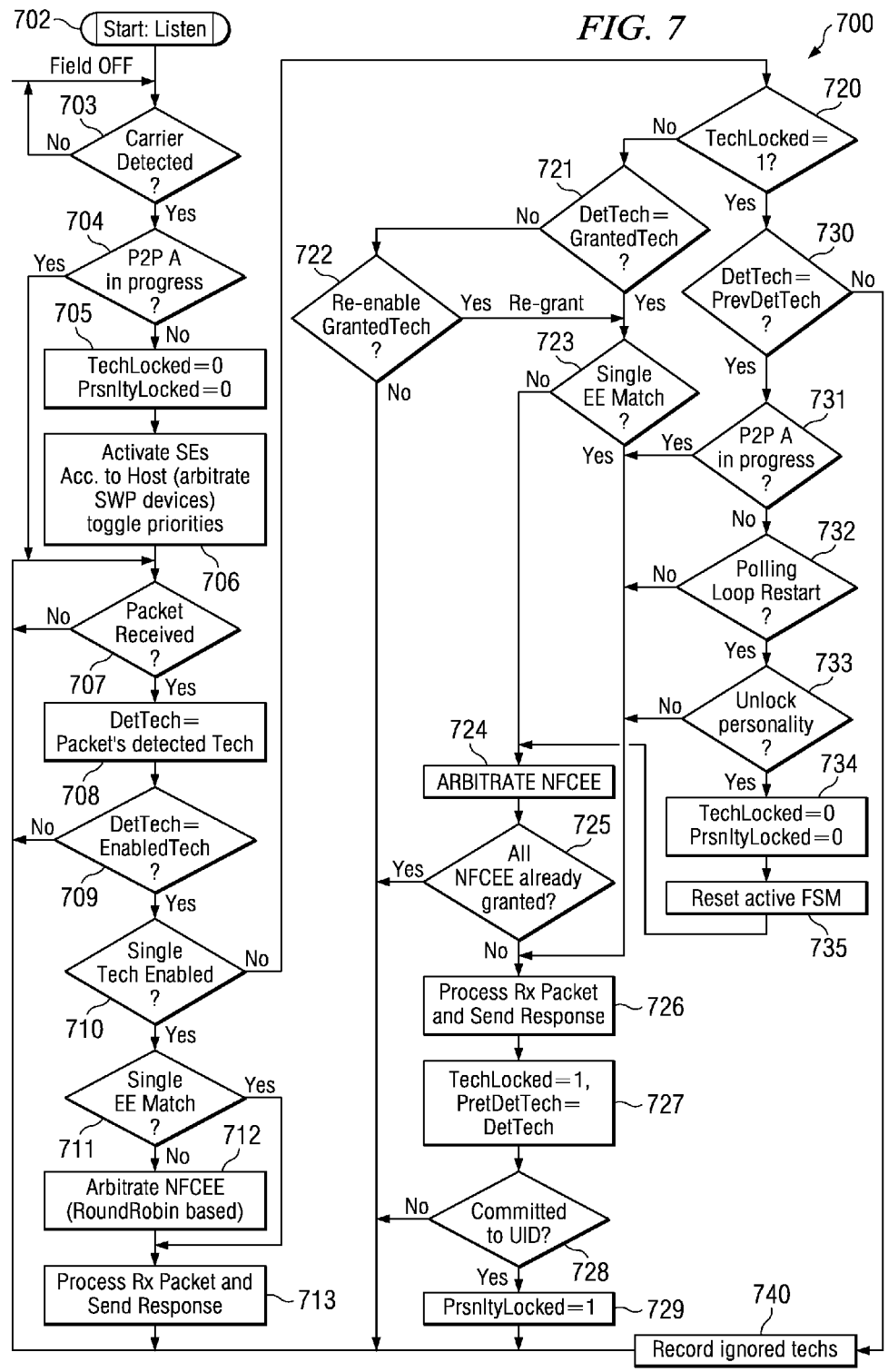
FIG. 7 is a flow chart illustrating arbitration of multiple NFC card applications and execution environments during polling loops.

FIG. 7 is a high-level flow chart 700 illustrating arbitration of multiple NFC card applications and execution environments during polling loops. The timing diagrams of FIGS. 6A-6C illustrate the operation of flow chart 700. At a given point in time, an NFC controller will start listening 702 to a reader device that is located in close proximity to the NFC controller. In battery On or Low mode, a distinction is made between short periods of Field-Off between polling loops, and long periods of no field (changing readers, removing the tag from the reader range and returning it). In case of a short field off period, EE grant priorities are changed as a part of the whole loop. In case of a long field-off period, a change of reader is assumed, and all grants are reset, thus allowing re-grant of all enabled technologies. At this point, there may be a current granted transport technology from a prior polling loop; if so, there will also be an enabled NFCEE that was using the granted technology. The NFC controller waits until a carrier from the proximate reader device is detected 703. If the NFC controller has a pending peer to peer exchange in progress 704, then it looks for a received packet 707. This is specifically a P2P "Active" communication mode in which each device transmits by using its own generated field so "field off/on" events occurs during/throughout the P2P session. If a peer to peer exchange was not in progress 704, then an initialization 705 is performed and a "TechLocked" variable is set to 0 to indicate that a technology is not locked, and a "PersonalityLocked" variable is set to 0 to indicate that application priority has not been locked. This is for cases where a technology by a certain NFCEE requires more than one polling loop grant within an application session.

The secure elements (SE) connected to the NFC controller are then activated 706. SEs may include an embedded SE, a micro SE, a UICC, etc. If the battery is low or off, then only a single SE is activated at a time; in this case, each SE connected to the NFC controller via a SWP interface will be activated in response to an arbitration sequence. The host may activate several execution environments. In this flow example, the relevant EE will be activated, toggling grants between the different SWP devices (UICC or SASE), according to priorities set by the host (in a VS command). If a non-SWP SASE is activated, it is assumed that it is known which technologies it supports (following a communication with the host during the NFCEE discovery process, for example). In case a DCLB/WI device is activated by the host, the RF data will be passed over to it (regardless of the current grant). The arbitration will be done in the response to that command (either pass through the DCLB/WI response or answer according to another EE's registry).

Once a packet is received 707 that is a Start of Frame (SoF) packet, the proximate reader has started a polling loop and has requested one or more transport technologies, as discussed with regards to FIGS. 6A-6C. The NFC controller then detects 708 what technologies are being requested. If the requested technologies do not match 709 the technologies that are enabled on the NFC controller, then the NFC controller waits 707 for the next SoF.

At 710, distinguish between a case where a single technology is enabled in the system and a case where several technologies are enabled. This eases the compliance with each technology specification. If there is only one technology being requested 710, then the NFC controller checks 711 to see if it has a single NFCEE matched to that technology. A single match can occur for two reasons. First, if there is in fact only one NFCEE available to the NFC that uses the detected technology. Second, if there are multiple NFCEEs with identical or shareable registry parameters. This could include random or identical UIDs, identical LEV4 or LEV4 and DEP SAK, no application data, etc. This may cover cases in which two NFCEE (e.g. 2*UICCs or UICC and Host) with applications of the same technology have set to the NFCC registry parameters (data required for the sake of connection establishment such as "UID" which is part of the response the controller should answer to the reader's polling command) that can be shared.

If there is a single NFCEE match 711, then the NFC controller processes received packets from the proximate reader and sends response packets back to the reader under control of the matched NFCEE(s). In this case, a higher layer NFCEE selection would be performed by the NFCC (e.g. acc. to AID or protocol identification—in case these differ; otherwise arbitration would be used). If there are multiple NFCEE matches 711, then the NFC controller performs arbitration 712 of the matching NFCEEs and activates one of the NFCEEs according to a round robin based arbitration selection process.

In the case where the NFC controller has more than one technology enabled and more than one was requested 710, then the NFC controller checks 720 to determine if the TechLocked variable has been set to "1". When a response is performed using a certain technology, this technology is then "locked" until a polling loop restart is detected. If not, the NFC controller checks 721 to determine if the requested technology is the same as the currently granted technology. If not, then the NFC controller checks 722 to determine if it should re-enable the granted technology. An enabled technology will be re-granted after one pass through this state, unless an enabled technology was ignored and not granted yet. This may be based on a certain number of commands being received, or for a defined timeout period, for example. If the decision to re-grant is no, then the NFC controller returns to state 707 and waits for the next SoF.

If the decision to re-grant is yes, then the NFC controller checks 723 to determine if there is a single NFCEE match. This test is similar to single match test 711. Likewise, if the requested technology is equal 721 to a granted technology, then the NFC controller checks 723 to determine if there is a single NFCEE match. In the case that there is a single NFCEE match, then the NFC controller processes 726 the packets received from the proximate reader and sends response packets to the proximate reader under control of the matched NFCEE. At this point 727, the "TechLocked" variable is set to "1" and the "PreDetTech" (previously detected technology) variable is set to the current technology. If at this point 728, if the NFC controller is committed to the currently selected UID, then the "PriorityLocked" variable is set to "1". Otherwise, the NFC controller returns to 707 and waits for the next SoF.

If there was not a single NFCEE match 723, then the NFC controller performs arbitration 724 of the matching NFCEEs and activates one of the NFCEEs according to a round robin based arbitration selection process, in a similar manner to 712. If 725 all NFCEEs for the current technology were already granted in this polling loop, then the NFC controller returns to 707 and waits for the next SoF. Otherwise, it proceeds to 726 and processes received packets, as describe above.

Returning to state 720, if the TechLocked variable was equal to "1", then the NFC controller checks 730 the PreDetTech variable. If it is not the same as the currently detected technology, then the other technologies are ignored and the currently technology is locked. The ignored technologies are recorded 740 and revisited the next time the NFC controller enters state 722. When granting of all EE's for a certain technology is finished, and additional REQs are received for that technology, then a re-grant that technology is called for. In order to prevent starvation of a technology which is more seldom requested by the reader, any unsuccessful polling attempt to that technology is recorded. A re-grant 722 to the technology that has already been answered will not occur until another attempt at the "starved" tech is encountered, or until a certain timeout/number of commands received is reached.

However, if the detected technology is the same 730 as the previously detected technology, then the NFC controller checks 731 to determine if a peer to peer session is in progress; if so, it proceeds to state 726 and processes received packets, as described above. Otherwise, it proceeds to state 732 to determine if a polling loop restart has occurred which is defined as a case where a polling loop command (e.g. REQA/WUPA for Tech A) is received for a technology that had been locked, selected by the remote reader but hasn't been set to sleep state. If not, it proceeds to state 726 and processes received packets, as described above. Otherwise, a check 733 is performed to determine if personality should be unlocked. Personality locking here refers to a case where a certain locked technology had committed to certain parameters and hence this should not be treated as a polling restart but rather continue processing it. If the "PrsnityLocked" (personality locked) variable is "1", then stay locked and proceed to state 726 and process received packets, as described above. For example, in technology F: poll command (sensF) with an NFC Data Exchange Format ("NDEF") System Code ("SC") parameter after poll with SC 0xFFFF shouldn't be treated as polling restart and the granted Tech & NFCEE should proceed responding to the Reader. Otherwise, the personality is then unlocked 734 and TechLocked is set to "0". The active (locked technology) Finite State Machine (implementing the connection establishment) protocol is reset 735 and the NFC controller proceeds to state 724 to arbitrate for the selection of the next NFCEE, as described above.

Thus, a system level application arbitration scheme is provided that allows multiple applications and NFCEEs to be supported in an interoperable manner while avoiding application starvation by prevention of locking onto the first detected technology. The scheme is compliant with EMV-Co's security constraints for payment contactless system since only a single device is presented at any one time. Multiple NFCEEs may be supported while using a single transport module because only one execution environment is active a time, thereby minimizing silicon area. A SWP interconnect may be multiplexed between the controller's various secure element interface pins. Application arbitration does not require user interaction to select an appropriate execution environment.

The application arbitration scheme described herein is not limited to a defined set of technologies. Therefore, various proprietary protocols may be easily supported. Even chip stream interface based eSEs are supported by sniffing their communication path.

The application arbitration scheme described herein specifically activates one type of each execution environment so that the physical transport modules can be reused and thereby minimize silicon size. Therefore, when there is an SWP based UICC and Wired Interface (WI) based SE, both may be activated at the same time if they don't use the same technology and then select the relevant one between them according to the $1^{st}$ poll command technology received from the remote POS. In some embodiments, it may be desirable to provide two or more physical transport modules to allow multiple execution environments to be activated.

Typically, round robin arbitration is performed if no other selection can be performed by the NFCC, e.g. according to technology if each NFCEE has different type of CE (communication environment) application technology, for instance, UICC-CE-TechA, SE-CE-TechB & Host-P2P-TechF; or according to AID, if the NFCEEs registries can be merged within the same technology such that the remote POS reader is introduced with a response from the controller that represents all the NFCEEs, and the selection is performed at a higher layer.

The application arbitration scheme described herein addresses cases of NFCEE registry conflicts that may occur in other systems that rely on application identification (AID). For example, consider a SIM that has technology A and an eSE that has technology A. Another system may use AID to keep track of these two; however, for NFC to get to the AID selection phase, it must first do connection establishment, and then AID is part of the data that is exchanged. For the connection establishment phase, registry configuration is relied upon that was provided by the NFCEE. So, assume reader sends poll A; the response to poll A is a unique ID (UID), (which could be pseudo random or could be a unique ID) that is configured by the EE. If the UICC configured a particular UID to poll A, and the eSE provided a different UID, then a registry conflict may result which may then prevent the NFC controller from doing any type of AID routing because it could not get to the point of receiving the AID. In an embodiment that uses application arbitration, the NFC would first use the A1 UID from the SIM card, then use the A2 UID from the eSE, for example.

The application arbitration scheme may reduce the amount of non-volatile memory required in the NFC controller. Other schemes may require a large amount of memory in the controller for storage of a routing table.

Other Embodiments

While the invention has been described with reference to illustrative embodiments, this description is not intended to be construed in a limiting sense. Various other embodiments of the invention will be apparent to persons skilled in the art upon reference to this description. For example, while a mobile handset 400 was descried herein, other types and configurations of mobile handsets may embody an application arbitration scheme for use by a contactless communication system as described herein. Other portable, or mobile systems such as data tablets, personal digital assistants, portable computers, game handsets, remote controls, access badges and fobs, smart credit/debit cards and emulators, and any other now known or later developed systems may embody an application arbitration scheme for use by a contactless communication system as described herein.

Furthermore, various fixed systems that perform contactless communication, such as card readers, access systems, transportation ticketing systems, etc may embody an application arbitration scheme for use by a contactless communication system as described herein.

While an interconnection between the NFC controller and the secure elements (eSE or UICC) has been described herein as being based on the standardized Single Wire Protocol, other embodiments may use a different interconnect mechanism, such as a USB, multiple parallel signals, etc.

While a round robin arbitration scheme has been described herein, other embodiments may employ other types of arbitration that may have various degrees of fairness, as long as the total starvation of any one application is prevented. Various levels of priority may be used to augment the various arbitration schemes in order to tailor the arbitration results as needed for a specific system. For example, priority may be applied to technology activation, NFCEE activation, application activation, etc.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium such as compact disc (CD), a diskette, a tape, a file, memory, or any other computer readable storage device and loaded and executed in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the preceding disscussion and in the claims, the terms "including" and "comprising" are used in an open-ended fashion, and thus should be interpreted to mean "including, but not limited to . . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method performed by a communications device for granting access to a plurality of near field communication execution environments, the method comprising:
    receiving periodic polling sessions, wherein each polling session includes one or more request commands to use a respective one or more of a plurality of communication protocols;
    granting access, in response to a request command during one of the polling sessions, to one type of the plurality of near field communication execution environments assigned to the requested communication protocol; and
    performing an arbitration in response to each polling session such that a same combination of communication protocol and execution environment is not activated for adjacent polling sessions.

2. The method of claim 1, further comprising granting more than one grant during a polling session when directed to do so by an arbitration weighting.

3. The method of claim 1, further comprising activating a single wire protocol based security element and wired interface based security element at the same time.

4. The method of claim 1, wherein the arbitration is performed in a round robin manner on the plurality of requested communication protocols.

5. The method of claim 1, wherein the arbitration is performed in a round robin manner on the plurality of execution environments.

6. The method of claim 1, wherein the arbitration is influenced by a priority value associated with each of the plurality of execution environments.

7. The method of claim 1, wherein when only one communication protocol is requested by a set of polling session, the arbitration forces a non-response to at least one polling session before a same combination of communication protocol and execution environment is activated again.

8. The method of claim 1, further comprising sniffing a data stream produced by the requested communication protocol to determine when a next polling session starts.

9. A contactless communication system comprising:
a near field communication (NFC) controller comprising circuitry for:
receiving periodic polling sessions, wherein each polling session includes one or more request commands to use a respective one or more of the plurality of communication protocols;
responding to only one of the request commands using a requested communication protocol and granting access to one type of execution environment assigned to the requested communication protocol to use the NFC controller; and
performing an arbitration in response to each polling session such that a same combination of communication protocol and execution environment is not activated for adjacent polling sessions.

10. The contactless system of claim 9, further comprising two or more secure elements coupled to the NFC controller, wherein each of the secure elements contains a plurality of card emulation applications that are each associated with one of a plurality of communication protocols, and at least one execution environment.

11. The contactless system of claim 9, further comprising a host processor and memory coupled to the NFC controller, wherein the host processor is configured to execute software instructions stored in the memory to provide a plurality of card emulation applications that are each associated with one of a plurality of communication protocols, and at least one execution environment.

12. The contactless system of claim 9 being a mobile handset, further comprising a radio frequency modem coupled to an application processor, the radio frequency modem configured to send and receive data streams from a cellular phone network.

13. The contactless system of claim 9, further comprising a secure element coupled to the NFC controller, wherein the secure element contains a plurality of card emulation applications that are each associated with one or more of a plurality of communication protocols, and at least one execution environment, wherein the secure element comprises an embedded processor and memory, wherein the embedded processor is configured to execute software instructions stored in the memory to provide the plurality of card emulation applications that are each associated with one of a plurality of communication protocols, and the at least one execution environment.

14. The contactless system of claim 13, wherein the secure element is a universal integrated circuit card.

15. An apparatus, comprising:
circuitry for receiving periodic polling sessions, wherein each polling session includes one or more request commands to use a respective one or more of a plurality of communication protocols;
circuitry for granting access, in response to a request command during one of the polling sessions, to one type of a plurality of near field communication execution environments assigned to the requested communication protocol; and
circuitry for performing an arbitration in response to each polling session such that a same combination of communication protocol and execution environment is not activated for adjacent polling sessions.

16. The apparatus of claim 15, further comprising circuitry for granting more than one grant during a polling session when directed to do so by an arbitration weighting.

17. The apparatus of claim 15, further comprising circuitry for activating a single wire protocol based security element and wired interface based security element at the same time.

18. The apparatus of claim 15, wherein the arbitration is performed in a round robin manner on the plurality of requested communication protocols.

19. The apparatus of claim 15, wherein the arbitration is performed in a round robin manner on the plurality of execution environments.

20. The apparatus of claim 15, wherein the arbitration is influenced by a priority value associated with each of the plurality of execution environments.

21. The apparatus of claim 15, wherein when only one communication protocol is requested by a set of polling session, the arbitration forces a non-response to at least one polling session before a same combination of communication protocol and execution environment is activated again.

22. The apparatus of claim 15, further comprising circuitry for sniffing a data stream produced by the requested communication protocol to determine when a next polling session starts.

23. A method performed by a communications device for granting access to a near field communication execution environment, the method comprising:
receiving periodic polling sessions, wherein each polling session includes a request command to use a respective communication protocol;
granting access, in response to a request command during one of the polling sessions, to a near field communication execution environment assigned to the requested communication protocol; and
performing an arbitration in response to each polling session such that a same combination of communication protocol and execution environment is not activated for adjacent polling sessions.

* * * * *